United States Patent
Yoshioka

(10) Patent No.: US 6,938,107 B2
(45) Date of Patent: Aug. 30, 2005

(54) MICROPROCESSOR PREVENTING ERRONEOUS WRITING TO CONTROL REGISTER

(75) Inventor: Nobuharu Yoshioka, Hyogo (JP)

(73) Assignee: Renesas Technology Corp., Tokyo (JP)

( * ) Notice: Subject to any disclaimer, the term of this patent is extended or adjusted under 35 U.S.C. 154(b) by 432 days.

(21) Appl. No.: 10/323,807

(22) Filed: Dec. 20, 2002

(65) Prior Publication Data

US 2003/0217200 A1 Nov. 20, 2003

(30) Foreign Application Priority Data

Apr. 26, 2002 (JP) ........................... 2002-126642

(51) Int. Cl.[7] .................... G06F 13/10; G06F 12/02
(52) U.S. Cl. .................... 710/36; 710/48; 711/163
(58) Field of Search ...................... 710/36, 48, 49, 710/200; 711/154, 163; 712/218, 227; 365/195

(56) References Cited

U.S. PATENT DOCUMENTS

| | | | | |
|---|---|---|---|---|
| 5,097,445 A | * | 3/1992 | Yamauchi | 365/195 |
| 5,600,818 A | * | 2/1997 | Weikmann | 711/163 |
| 6,126,070 A | * | 10/2000 | Fukuzumi | 235/380 |
| 6,367,050 B1 | * | 4/2002 | Akao et al. | 716/1 |
| 6,584,540 B1 | * | 6/2003 | Shinmori | 711/103 |
| 6,715,049 B1 | * | 3/2004 | Hayakashi | 711/163 |

FOREIGN PATENT DOCUMENTS

JP     05-101203     4/1993

* cited by examiner

Primary Examiner—Ilwoo Park
(74) Attorney, Agent, or Firm—McDermott Will & Emery LLP

(57) ABSTRACT

A transfer circuit transfers a write inhibit address stored in a ROM to an address register. An access preventing circuit inhibits writing to a control register by a CPU when an address outputted from the CPU coincides with a write inhibit address stored in the address register. Since the address register is a register to which data cannot be written by the CPU, a write inhibit address stored in the address register is not changed. Therefore, the write inhibition to the control register is not canceled, so that erroneous operation of the CPU can be prevented.

15 Claims, 8 Drawing Sheets

FIG.6

| 0x1 | ADDRESS 1 | DATA 1 |
|---|---|---|
| 0x2 | ADDRESS 2 | DATA 2 |
| 0x3 | ADDRESS 3 | DATA 3 |
| 0x4 | ADDRESS 4 | DATA 4 |

MICROPROCESSOR PREVENTING ERRONEOUS WRITING TO CONTROL REGISTER

BACKGROUND OF THE INVENTION

1. Field of the Invention

The present invention relates to a microprocessor including a peripheral I/O (Input/Output) having a control register for controlling internal operations and making a setting, and more particularly to a microprocessor preventing erroneous writing to a control register.

2. Description of the Background Art

FIG. 1 is a block diagram showing an example of a conventional microprocessor including a circuit for preventing erroneous writing to peripheral I/Os and control registers of the peripheral I/Os. The microprocessor includes a CPU (Central Processing Unit) 101, peripheral I/Os 105a and 105b, an address decoder 104 for decoding an address outputted to an address bus 102 and generating a peripheral I/O selection signal 109 for selecting a peripheral I/O, a register 110 for storing the addresses of the peripheral I/Os to which erroneous writing is prevented, a comparator 111 for comparing the address outputted to address bus 102 and an address stored in register 110, a NAND gate 112, and an AND gate 113.

Peripheral I/Os 105a and 105b have control register groups 151a and 151b, respectively. CPU 101 writes a predetermined value to control register group 151a or 151b, thereby controlling the operations of peripheral I/Os 105a and 105b. In the case where CPU 101 writes a value to control register group 151a or 151b, first, a peripheral I/O access request signal 106 is set to a high (H) level to notify address decoder 104 of an access to the peripheral I/O. Simultaneously, CPU 101 sets a write valid signal 107 to the H level indicating that writing is valid, and outputs the address of the control register to which a value is set to address bus 102.

When peripheral I/O access request signal 106 rises to H level, address decoder 104 receives and decodes the address output to address bus 102 and, according to the result of decoding of the address, validates peripheral I/O selection signal 109 for selecting peripheral I/O 105a or 105b.

Since write valid signal 107 is valid, selected peripheral I/O 105a or 105b receives the address outputted to address bus 102 and data outputted to a data bus 103, and writes the data to the control register selected by the address. In such a manner, peripheral I/O 105a or 105b sets a value to its control register and performs operation.

In the case of inhibiting writing of data to the control register in peripheral I/O 105a or 105b, CPU 101 sets the address of the control register into register 110. Comparator 111 compares the address outputted to address bus 102 at the time of writing a value to the control register in peripheral I/O 105a or 105b with the address set in register 110 and, if the addresses coincide with each other, outputs an H level signal.

When the H level signal is outputted from comparator 111 and write valid signal 107 is at the H level (valid), NAND gate 112 outputs a low (L) level signal. At this time, AND gate 113 masks peripheral I/O access request signal 106 and outputs an L level signal to address decoder 104. As a result, address decoder 104 invalidates all of peripheral I/O selection signals 109, thereby canceling a write request to peripheral I/O 105a or 105b.

In the conventional microprocessor, CPU 101 can freely write the address of the control register to which writing is inhibited into register 110. Consequently, when the data in register 110 is rewritten due to a bug in a program executed by CPU 101 or erroneous operation of CPU 101, inhibition of writing to the control register in the peripheral I/O is canceled, and it causes a problem that writing inhibition cannot be normally performed.

SUMMARY OF THE INVENTION

An object of the present invention is to provide a microprocessor capable of prohibiting occurrence of erroneous operation which is caused when write inhibition to a control register is canceled.

Another object of the present invention is to provide a microprocessor capable of inhibiting writing to a control register only at the time of debugging a program.

Further another object of the present invention is to provide a microprocessor capable of easily debugging a program.

According to an aspect of the present invention, a microprocessor includes: a processor; a peripheral I/O having a control register; an address register for storing an address of a control register to which writing is inhibited, to which data cannot be written by the processor; and a write inhibiting circuit for inhibiting writing to the control register by the processor when an address outputted from the processor coincides with the address stored in the address register.

Since the processor cannot write data to an address register, an address stored in the address register is not changed. Therefore, write inhibition to the control register is not canceled, so that erroneous operation of the microprocessor can be prevented.

According to another aspect of the present invention, a microprocessor includes: a processor; a peripheral I/O having a control register; an address register for storing an address of a control register to which writing is inhibited; a write inhibiting circuit for inhibiting writing to the control register by the processor when an address outputted from the processor coincides with the address stored in the address register; a nonvolatile memory for storing an address of a control register to which writing is inhibited; and a transfer circuit for transferring the address stored in the nonvolatile memory to the address register.

With the configuration, it becomes unnecessary to set the address of a peripheral I/O to which writing is inhibited into an address register by a program, so that higher processing speed is achieved.

According to further another aspect of the present invention, a microprocessor includes: a processor; a peripheral I/O having a control register; a first associative memory for storing an address of a control register to which writing is inhibited, to which data cannot be written by the processor; and a write inhibiting circuit for inhibiting writing to the control register by the processor when an address outputted from the processor coincides with the address stored in the first associative memory.

Since the addresses of the plurality of control registers can be stored in the first associative memory, in addition to the above-described effects, the configuration of the circuit for inhibiting writing to the control register can be simplified.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 6 is a diagram showing an example of data stored in a ROM 13B shown in FIG. 5;

DESCRIPTION OF THE PREFERRED EMBODIMENTS

First Embodiment

Figure 1:
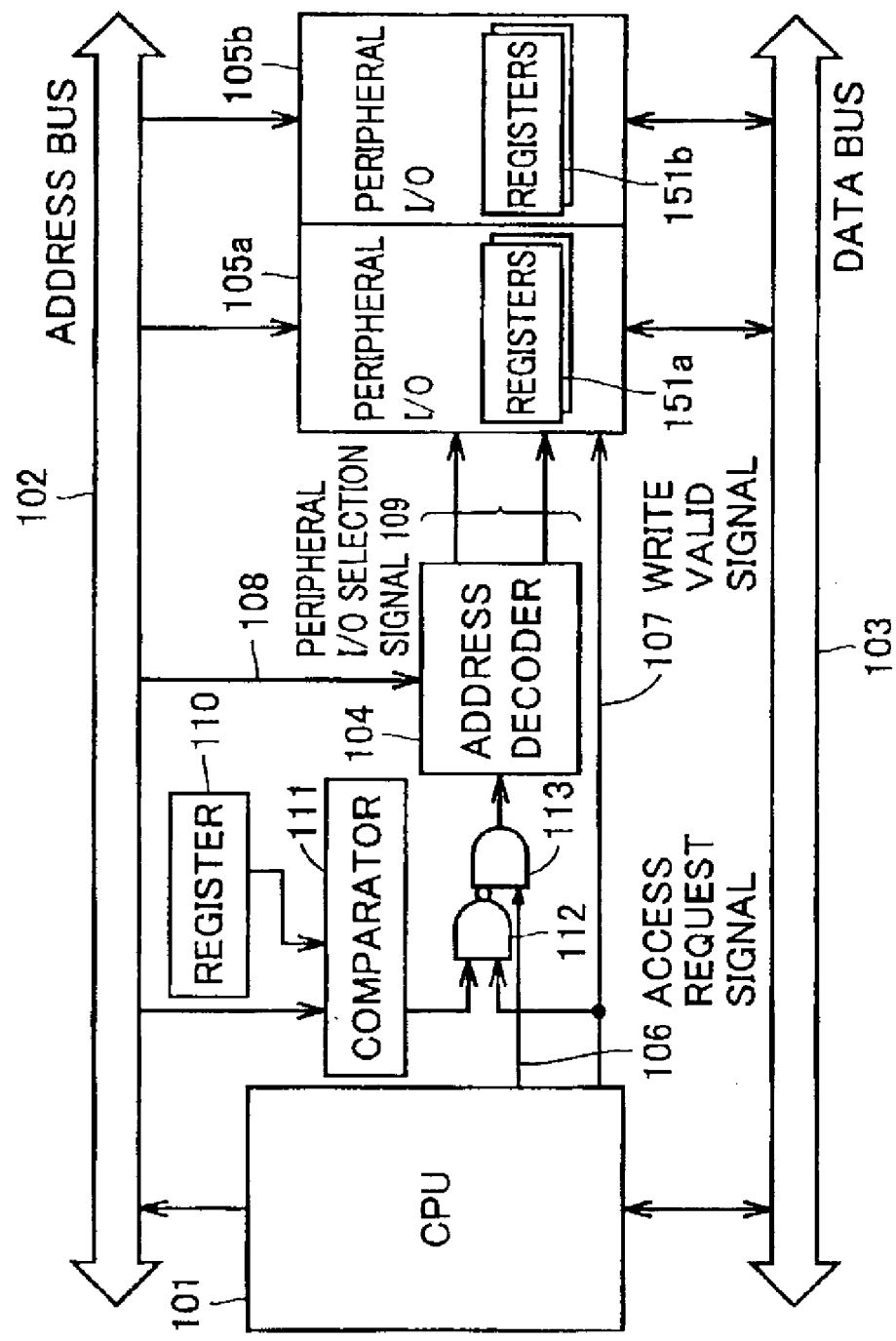
FIG. 1 is a block diagram showing an example of a conventional microprocessor including a peripheral I/O and a circuit for preventing erroneous writing to a peripheral I/O and a control register of the peripheral I/O.
Figure 2:
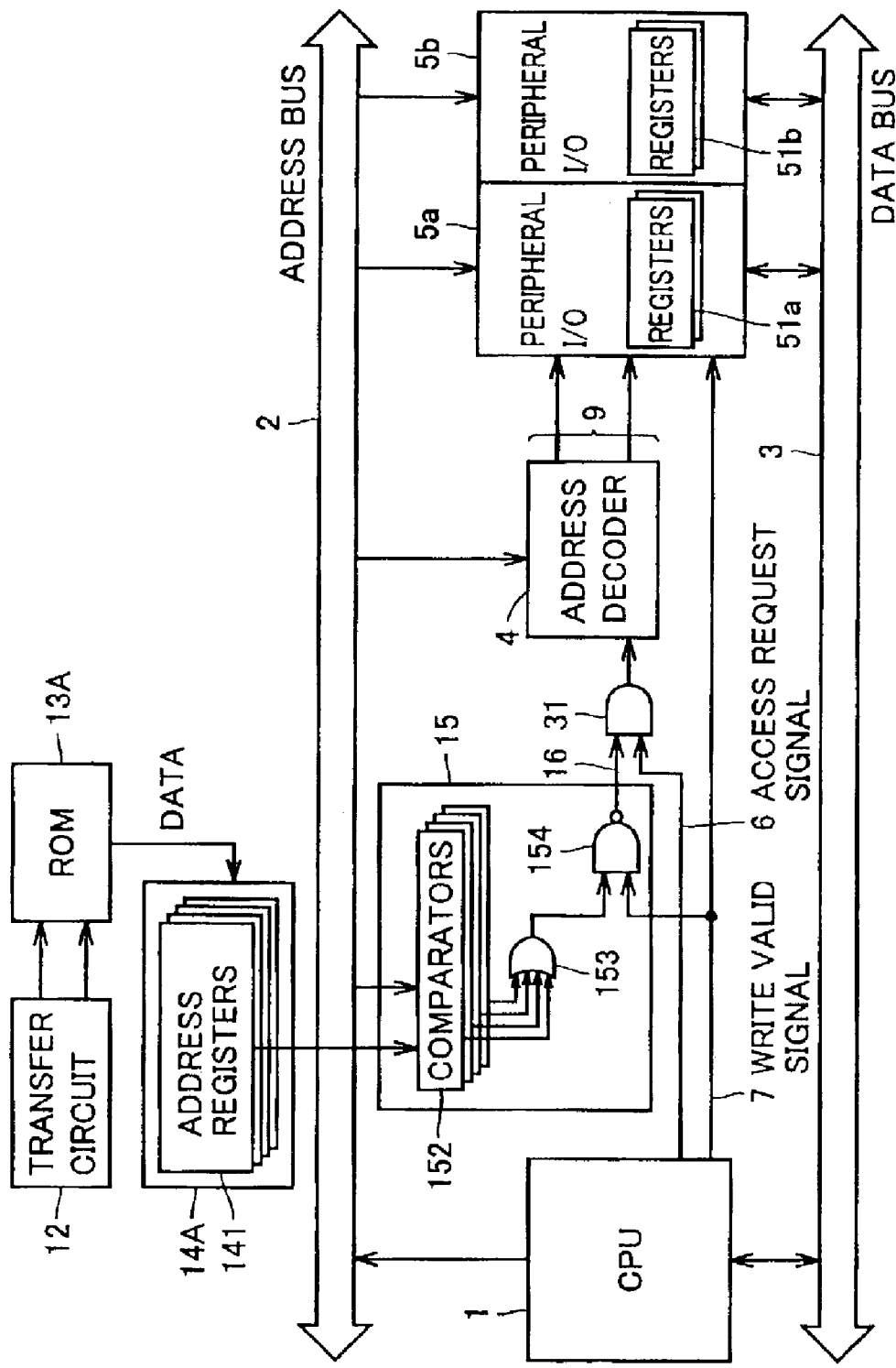
FIG. 2 is a block diagram showing a schematic configuration of a microprocessor according to a first embodiment of the present invention.

FIG. 2 is a block diagram showing a schematic configuration of a microprocessor according to the first embodiment of the present invention. The microprocessor includes a CPU 1, peripheral I/Os 5a and 5b, an address decoder 4 for decoding an address outputted to an address bus 2 and generating a peripheral I/O selection signal 9 for selecting a peripheral I/O, a ROM (Read Only Memory) 13A for storing write inhibit addresses, an access inhibit table 14a for holding a write inhibit address, a transfer circuit 12 for transferring the write inhibit addresses stored in ROM 13A to access inhibit table 14A, an access preventing circuit 15 for preventing an access to peripheral I/O 5a or 5b on the basis of the write inhibit address held in access inhibit table 14A, and an AND gate 31. ROM 13A in which the write inhibit address is stored may be other nonvolatile memories.

The microprocessor is constructed by a single semiconductor chip. ROM 13A may be provided inside or outside of the semiconductor chip.

Peripheral I/Os 5a and 5b have control register groups 51a and 51b, respectively. When CPU 1 writes a predetermined value to control register group 51a or 51b, peripheral I/Os 5a and 5b operate.

When a peripheral I/O access request signal 6 rises to H level, address decoder 4 receives the address outputted to address bus 2 and validates peripheral I/O selection signal 9 for selecting peripheral I/O 5a or 5b in accordance with a result of decoding of the address.

Access inhibit table 14A includes a plurality of address registers 141. To plurality of address registers 141, a write inhibit address stored in ROM 13A is transferred. Access inhibit table 14A cannot be accessed by CPU 1.

Access preventing circuit 15 includes a plurality of comparators 152 corresponding to address registers 141, an OR gate 153, and a NAND gate 154. Each of the plurality of comparators 152 compares the address outputted to address bus 2 with the write inhibit address stored in corresponding address register 141 and, when the addresses coincide with each other, outputs the H level signal. When any of comparators 152 outputs the H level signal, OR gate 153 outputs an H level signal to NAND gate 154. When the output signal of OR gate 153 is at the H level and a write valid signal 7 is at the H level (valid), NAND gate 154 sets a peripheral I/O access cancel signal 16 to the L level.

Figures 3, 4:
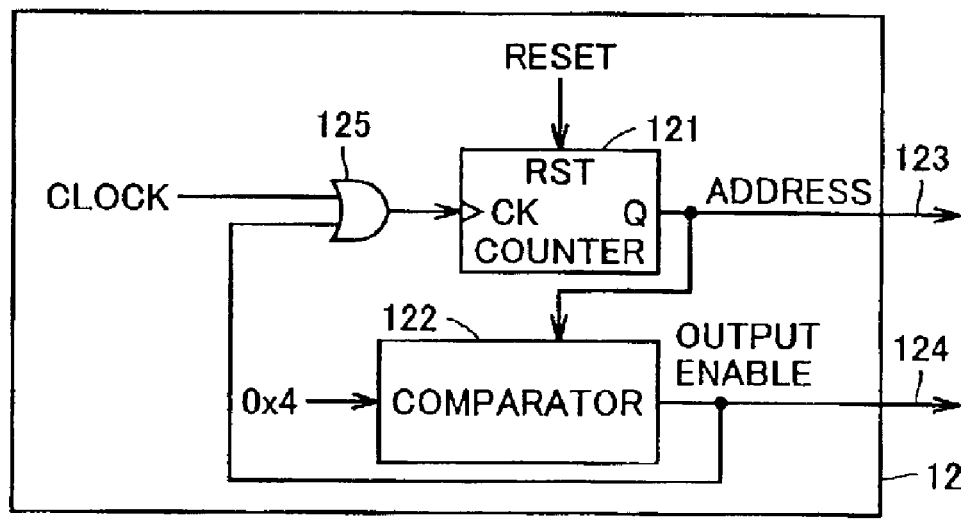
FIG. 3 is a block diagram showing the configuration of a transfer circuit 12 shown in FIG. 2.
FIG. 4 is a diagram showing an example of data stored in a ROM 13A shown in FIG. 2.

FIG. 3 is a block diagram showing the configuration of a transfer circuit 12 shown in FIG. 2. Transfer circuit 12 includes a counter 121, a comparator 122, and an OR gate 125. Transfer circuit 12 controls ROM 13A so as to transfer write inhibit addresses stored in ROM 13A to address register 141 in response to a signal supplied from the outside of the semiconductor chip, for example, a reset signal. The reset signal is also supplied to CPU 1. To start a system in which the microprocessor is assembled, CPU 1 reads out a program from a memory (not shown) in response to the reset signal and executes the program.

At the time of resetting of the microprocessor, counter 121 is reset and outputs "0×0", and increments its count value at the rising edge of a clock signal. The count value of counter 121 is outputted as an address 123 to ROM 13A.

Comparator 122 compares the count value (address 123) of counter 121 with a value "0×4", outputs an L level signal when the values do not coincide with each other, and outputs an H level signal when the values coincide with each other. A signal outputted from comparator 122 is used as an output enable signal 124 of ROM 13A. When the count value of counter 121 becomes "0×4", comparator 122 outputs an H level signal. As a result, OR gate 125 masks the clock signal, thereby stopping incrementing of the count value of counter 121.

FIG. 4 is a diagram showing an example of data stored in ROM 13A shown in FIG. 2. Four write inhibit addresses (addresses 1 to 4) are stored in ROM 13A, and the write inhibit addresses are transferred by transfer circuit 12 to access inhibit table 14A. Access inhibit table 14A sequentially registers write inhibit addresses outputted from ROM 13A to address register 141.

When CPU 1 writes data to peripheral I/O 5a or 5b, access preventing circuit 15 compares an address outputted to address bus 2 with the write inhibit addresses registered in address register 141. If any of the write inhibit addresses registered in address register 141 coincides with the address outputted to address bus 2, the access preventing circuit 15 sets a peripheral I/O access cancel signal 16 to the L level.

At this time, an AND gate 31 masks peripheral I/O access request signal 6, and outputs an L level signal to address decoder 4. Accordingly, address decoder 4 invalidates all of peripheral I/O selection signals 9, thereby canceling a write request to peripheral I/O 5a or 5b.

As described above, according to the microprocessor in the embodiment, the write inhibit address stored in ROM 13A is transferred to access inhibit table 14 which cannot be accessed by CPU 1 immediately after resetting, and access preventing circuit 15 masks peripheral I/O access request signal 6 on the basis of the write inhibit address. Consequently, a problem such that data in address register 141 is rewritten due to a bug in a program executed by CPU 1 or erroneous operation of CPU 1 can be prevented.

By registering the address of the peripheral I/O inhibited to be used by the user into ROM 13A, writing to the peripheral I/O can be prevented, and erroneous operation of the microprocessor can be prevented.

Further, immediately after resetting of the microprocessor, a write inhibit addresses registered in ROM 13A are automatically transferred to write inhibit table 14A. Consequently, it becomes unnecessary to set the write inhibit address to address register 141 by a program, so that higher processing speed is achieved.

Second Embodiment

Figure 5:
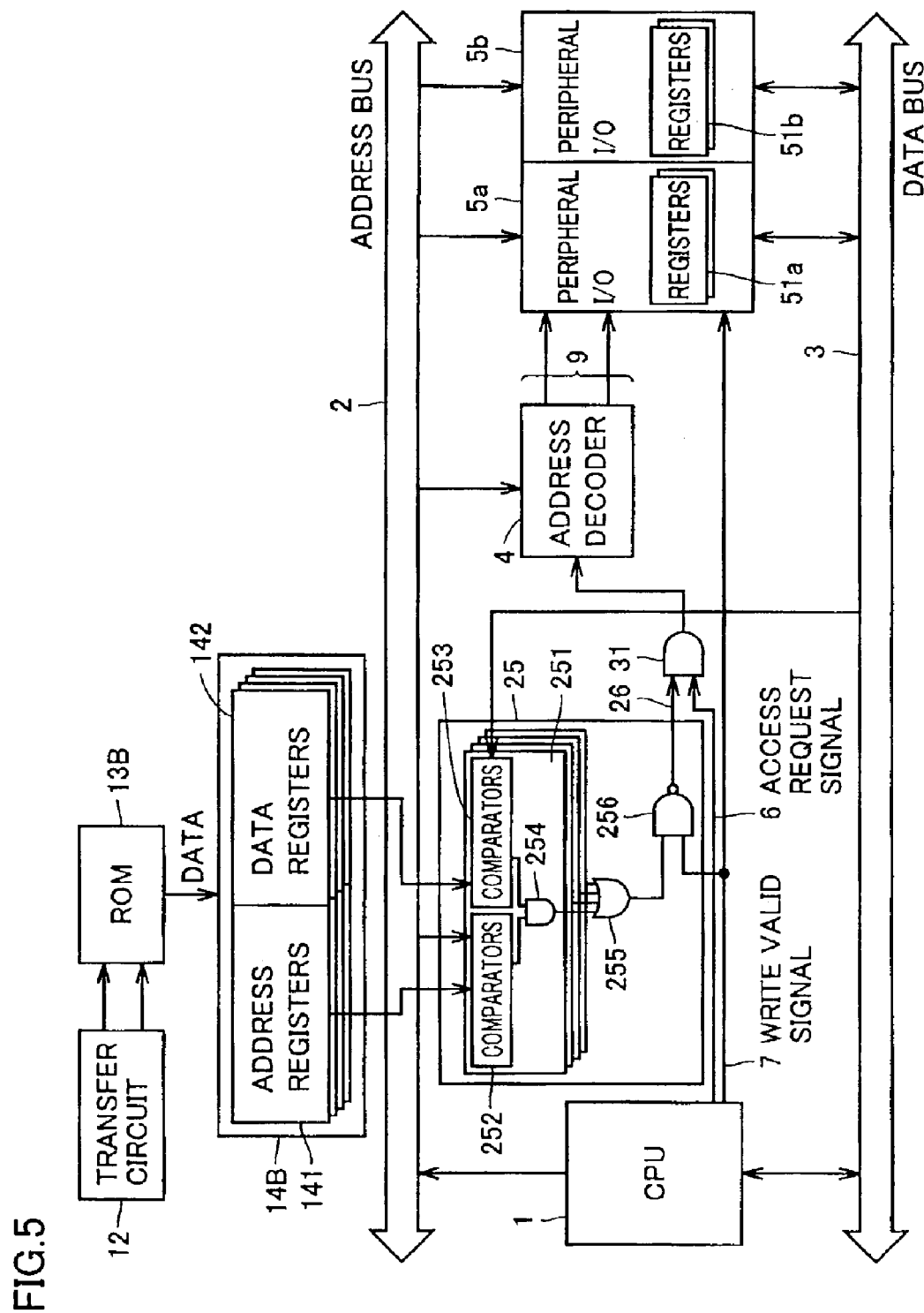
FIG. 5 is a block diagram showing a schematic configuration of a microprocessor according to a second embodiment of the present invention.

FIG. 5 is a block diagram showing a schematic configuration of a microprocessor according to a second embodiment of the present invention. The microprocessor includes CPU 1, peripheral I/Os 5a and 5b, address decoder 4, a ROM 13B for storing a write inhibit address and write inhibit data, an access inhibit table 14B for holding the write inhibit address and write inhibit data, transfer circuit 12 for transferring the write inhibit address and write inhibit data stored in ROM 13B to access inhibit table 14B, an access preventing circuit 25 for preventing an access to peripheral I/O 5a or 5b on the basis of the write inhibit address and write inhibit data stored in access inhibit table 14B, and AND gate 31. The same reference numeral is designated to a part having the same configuration and function as that in the microprocessor in the first embodiment shown in FIG. 2.

The microprocessor is constructed by a single semiconductor chip. However, ROM 13B may be provided either inside or outside of the semiconductor chip.

Access inhibit table 14B includes a plurality of address registers 141 and a plurality of data registers 142. To the plurality of address registers 141, write inhibit addresses stored in ROM 13B are transferred. To the plurality of data registers 142, the write inhibit data stored in ROM 13B are transferred. Access inhibit table 14B cannot be accessed by CPU 1.

Transfer circuit 12 controls ROM 13B so as to transfer the write inhibit addresses and write inhibit data stored in ROM 13B to address registers 141 and data resisters 142 in response to a signal supplied from the outside of the semiconductor chip, for example, a reset signal. The reset signal is also supplied to CPU 1. To start a system in which the microprocessor is assembled, CPU 1 reads out a program from a memory (not shown) in response to the reset signal and executes the program.

Access preventing circuit 25 includes a plurality of coincidence detecting circuits 251, an OR gate 255, and a NAND gate 256. Coincidence detecting circuits 251 include a plurality of comparators 252 corresponding to address registers 141, a plurality of comparators 253 corresponding to data registers 142, and an AND gate 254, respectively.

Each of the plurality of comparators 252 compares the address outputted to address bus 2 with the write inhibit address stored in corresponding address register 141 and, when the addresses coincide with each other, outputs the H level signal. Each of the plurality of comparators 253 compares the data outputted to data bus 3 with the write inhibit data stored in corresponding address register 142 and, when the data coincide with each other, outputs the H level signal. When comparators 252 and 253 output the H-level signals, AND gate 254 outputs an H level signal indicative of detection of coincidence.

When any of output signals of coincidence detecting circuits 251 rises to H level, OR gate 255 outputs an H level signal to NAND gate 256. NAND gate 256 sets a peripheral I/O access cancel signal 26 to the L level when the output signal of OR gate 255 is at the H level and write valid signal 7 is at the H level (valid).

FIG. 6 is a diagram showing an example of data stored in ROM 13B shown in FIG. 5. In ROM 13B, four write inhibit addresses (addresses 1 to 4) and write inhibit data (data 1 to 4) are stored. By transfer circuit 12, the write inhibit address and write inhibit data are transferred to access inhibit table 14B. Access inhibit table 14B sequentially registers the write inhibit addresses and write inhibit data outputted from ROM 13B into address register 141 and data resister 142, respectively.

When CPU 1 writes data to peripheral I/O 5a or 5b, each of coincidence detection circuits 251 compares an address outputted to address bus 2 and data outputted to data bus 3 with each of the write inhibit addresses registered in address registers 141 and write inhibit data stored in data registers 142. If any of the coincidence detection circuits 251 detects coincidence, access preventing circuit 25 sets peripheral I/O access cancel signal 26 to the L level.

At this time, AND gate 31 masks peripheral I/O access request signal 6, and outputs an L level signal to address decoder 4. Accordingly, address decoder 4 invalidates all of peripheral I/O selection signals 9, thereby canceling a write request to peripheral I/O 5a or 5b.

As described above, in the microprocessor in the embodiment, immediately after resetting, the write inhibit addresses and write inhibit data stored in ROM 13B are transferred to access inhibit table 14B which cannot be accessed by CPU 1, and access preventing circuit 25 masks peripheral I/O access request signal 6 on the basis of the write inhibit address and write inhibit data. Consequently, a problem such that data in address register 141 and data register 142 is rewritten due to a bug in a program executed by CPU 1 or erroneous operation of CPU 1 can be prevented.

By registering the address of the peripheral I/O to which writing of predetermined data by the user is inhibited and the predetermined data into ROM 13B, writing of the predetermined data to the peripheral I/O can be prevented, and erroneous operation of the microprocessor can be prevented. For example, to a peripheral I/O of which operation mode is changed by setting a predetermined value to the control register, by setting the address of the peripheral I/O and the predetermined value to address register 141 and data register 142, the operation mode can be prevented from being changed.

Further, immediately after resetting of the microprocessor, a write inhibit addresses and write inhibit data registered in ROM 13B are automatically transferred to write inhibit table 14B. Consequently, it becomes unnecessary to set the write inhibit address and write inhibit data to address register 141 and data register 142 by a program, so that higher processing speed is achieved.

Third Embodiment

Figure 7:
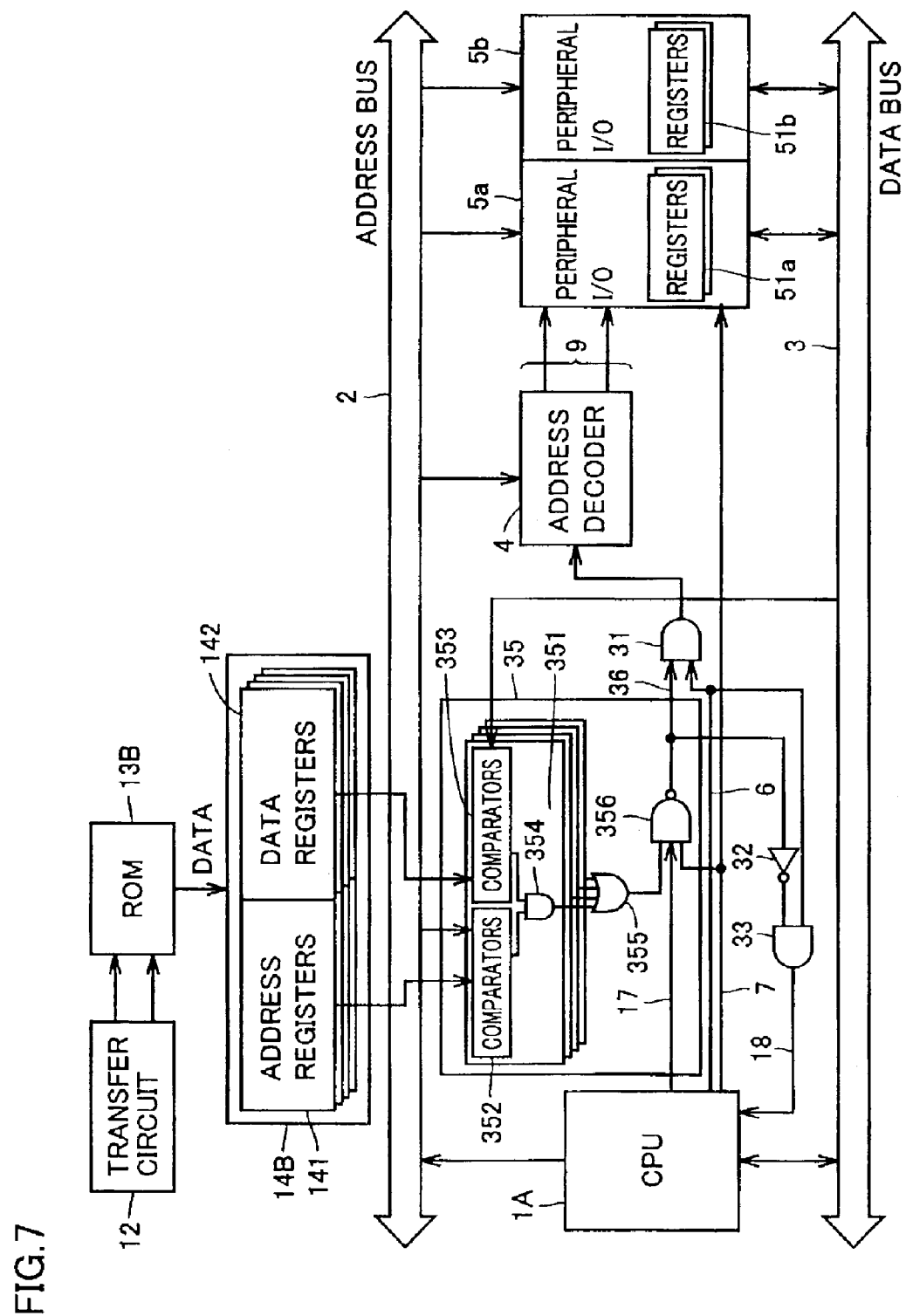
FIG. 7 is a block diagram showing a schematic configuration of a microprocessor according to a third embodiment of the present invention.

FIG. 7 is a block diagram showing a schematic configuration of a microprocessor according to a third embodiment of the present invention. The microprocessor includes a CPU 1A, peripheral I/Os 5a and 5b, address decoder 4, ROM 13B for storing write inhibit addresses and write inhibit data, access inhibit table 14B for holding the write inhibit addresses and write inhibit data, transfer circuit 12 for transferring the write inhibit addresses and write inhibit data stored in ROM 13B to access inhibit table 14B, an access preventing circuit 35 for preventing an access to peripheral I/O 5a or 5b on the basis of the write inhibit addresses and write inhibit data stored in access inhibit table 14B, AND gates 31 and 33, and an inverter 32. The same reference numeral is designated to a part having the same configuration and function as that in the microprocessor in the second embodiment shown in FIG. 5.

The microprocessor is constructed by a single semiconductor chip. ROM 13B may be provided either inside or outside of the semiconductor chip.

Access preventing circuit 35 includes a plurality of coincidence detecting circuits 351, an OR gate 355, and a NAND gate 356. Coincidence detecting circuits 351 includes a plurality of comparators 352 corresponding to address registers 141, a plurality of comparators 353 corresponding to data registers 142, and an AND gate 354, respectively.

Each of the plurality of comparators 352 compares the address outputted to address bus 2 with the write inhibit address stored in corresponding address register 141 and, when the addresses coincide with each other, outputs an H level signal. Each of the plurality of comparators 353 compares the data outputted to data bus 3 with the write inhibit data stored in corresponding address register 142 and, when the data coincide with each other, outputs an H level signal. When comparators 352 and 353 output the H-level signals, AND gate 354 outputs an H level signal indicative of detection of coincidence.

When any of outputs of coincidence detecting circuits 351 rises to H level, OR gate 355 outputs an H level signal to NAND gate 356. NAND gate 356 sets a peripheral I/O access cancel signal 36 to the L level when the output signal of OR gate 355 is at the H level, write valid signal 7 is at the H level (valid), and a CPU operation mode signal 17 is at the H level.

If CPU 1A is in a debugging mode, CPU 1A sets CPU operation mode signal 17 to the H level. If CPU 1A is in the normal mode, CPU 1A sets CPU operation mode signal 17 to the L level.

When CPU 1A writes data to peripheral I/O 5a or 5b, each of coincidence detection circuits 351 compares an address outputted to address bus 2 and data outputted to data bus 3 with each of the write inhibit addresses registered in address registers 141 and write inhibit data stored in data registers 142. If any of the coincidence detection circuits 251 detects coincidence and CPU operation mode signal 17 indicates the debugging mode, access preventing circuit 35 sets peripheral I/O access cancel signal 36 to the L level.

At this time, AND gate 31 masks peripheral I/O access request signal 6, and outputs an L level signal to address decoder 4. Accordingly, address decoder 4 invalidates all of peripheral I/O selection signals 9, thereby canceling a write request to peripheral I/O 5a or 5b.

When the output signal of NAND gate 356 falls to L level, that is, an output signal of inverter 32 rises to H level, and peripheral I/O access request signal 6 rises to H level, AND gate 33 sets an interrupt request signal 18 to the H level to generate an interruption to CPU 1A. In such a manner, when predetermined data is written to the control register to which writing is inhibited, an interruption to CPU 1A can be generated.

As described above, in the microprocessor in the embodiment, immediately after resetting, the write inhibit addresses and write inhibit data stored in ROM 13B are transferred to access inhibit table 14B which cannot be accessed by CPU 1A, and access preventing circuit 35 masks peripheral I/O access request signal 6 on the basis of the write inhibit addresses, write inhibit data, and CPU operation mode signal 17. Consequently, in addition to the effects described in the second embodiment, only at the time of debugging of a program, writing of predetermined data to the control register can be inhibited.

In the case where predetermined data is written to the control register to which writing is inhibited, an interruption to CPU 1A is generated, so that the user can easily debug a program.

Fourth Embodiment

Figure 8:
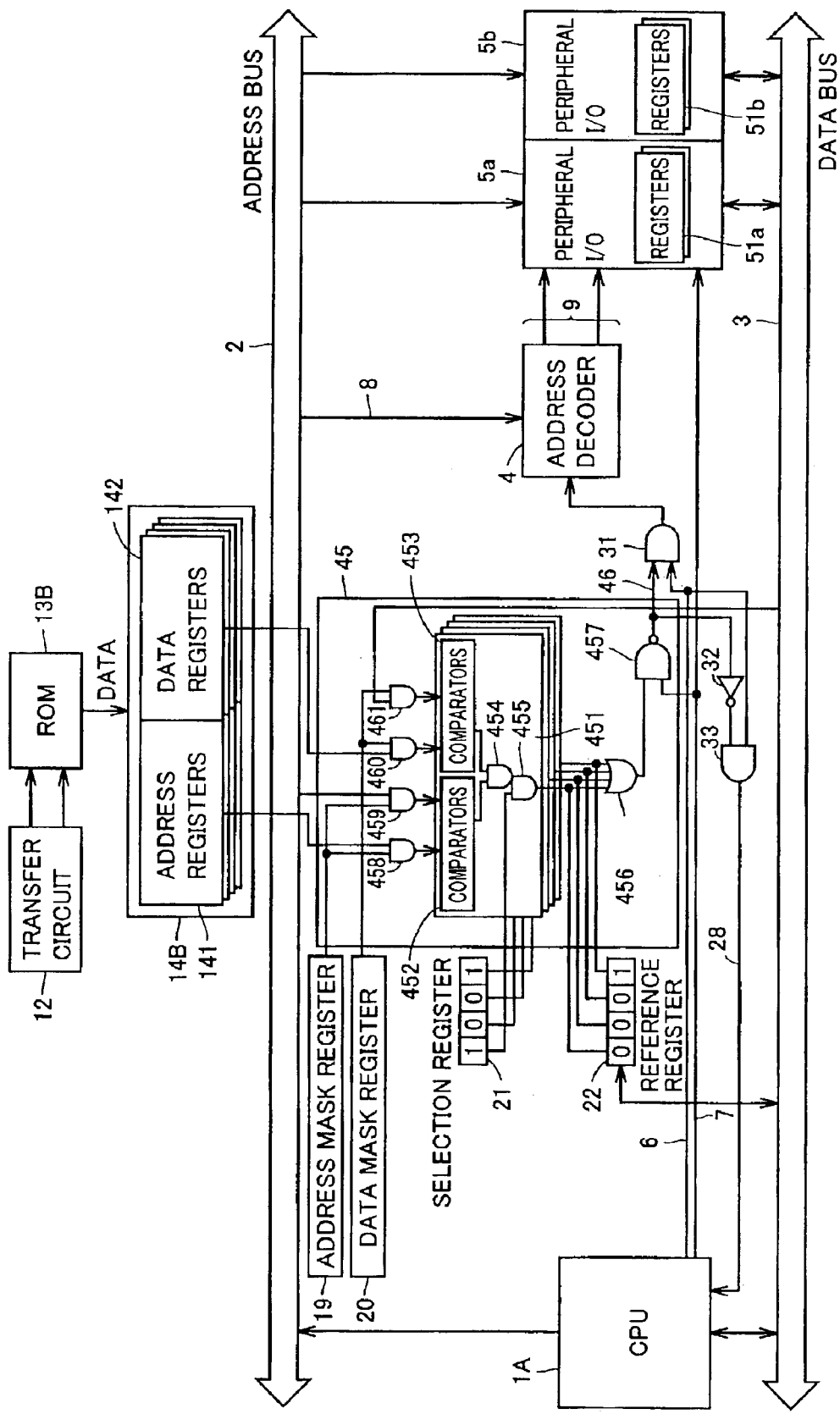
FIG. 8 is a block diagram showing a schematic configuration of a microprocessor according to a fourth embodiment of the present invention.

FIG. 8 is a block diagram showing a schematic configuration of a microprocessor according to a fourth embodiment of the present invention. The microprocessor includes CPU 1A, peripheral I/Os 5a and 5b, address decoder 4, ROM 13B for storing write inhibit addresses and write inhibit data, access inhibit table 14B for holding the write inhibit addresses and write inhibit data, transfer circuit 12 for transferring the write inhibit addresses and write inhibit data stored in ROM 13B to access inhibit table 14B, an address mask register 19, a data mask register 20, an inhibit table selection register 21, an inhibit access reference register 22, an access preventing circuit 45 for preventing an access to peripheral I/O 5a or 5b on the basis of the write inhibit addresses and write inhibit data held in access inhibit table 14B, AND gates 31 and 33, and inverter 32. The same reference numeral is designated to a part having the same configuration and function as that in the microprocessor in the second embodiment shown in FIG. 5.

The microprocessor is constructed by a single semiconductor chip. ROM 13B may be provided either inside or outside of the semiconductor chip.

Address mask register 19, data mask register 20, inhibit table selection register 21, and inhibit access reference register 22 are registers which can be accessed by CPU 1A.

Address mask register 19 is a register for designating a bit of an address to be masked at the time of comparing the address stored in address register 141 with the address outputted to address bus 2. The address corresponding to a bit position in which "0" is designated in address mask register 19 is masked, and only the address corresponding to a bit position in which "1" is set is compared, thereby enabling addresses of peripheral I/Os in continuous regions to be designated.

Data mask register 20 is a register for designating a bit of data to be masked at the time of comparing data stored in data register 142 with data outputted to data bus 3. The data corresponding to the bit position in which "0" is set in data mask register 20 is masked, and only data corresponding to the bit position in which "1" is set is compared, thereby enabling only coincidence of a predetermined bit in data to be detected.

Inhibition table selection register 21 is a register for designating address register 141 and data register 142 in access inhibit table 14B, based on which comparison is validated. Comparison based on address register 141 and data register 142 corresponding to the bit position in which "0" is set in inhibition table selection register 21 is made invalid. Comparison based on address register 141 and data register 142 corresponding to the bit position in which "1" is set in inhibition table selection register 21 is made valid.

Inhibition access reference register 22 is a register in which comparison results of a plurality of coincidence detection circuits 451 are stored. In the case where "0" is stored in a bit of inhibition access reference register 22, it denotes that coincidence detecting circuit 451 corresponding to the bit position detects mismatch. In the case where "1" is stored in a bit of inhibit access reference register 22, it denotes that coincidence detection circuit 45 detects coincidence. CPU 1A can know a control register to which a write inhibit access is made by referring to the data in inhibit access reference register 22.

Access preventing circuit 45 includes the plurality of coincidence detecting circuits 451, an OR gate 456, a NAND gate 457, and AND gates 458 to 461. Coincidence detecting circuits 451 include a plurality of comparators 452 corresponding to address registers 141, a plurality of comparators 453 corresponding to data registers 142, and AND gates 454 and 455, respectively.

AND gate 458 performs an AND operation on each of bits of an address stored in address register 141 and each of bits of data set in address mask register 19, and outputs the result of operation to comparator 452. It is assumed that AND gates 458 of the number equal to the number of bits of an address exist.

AND gate 459 performs an AND operation on each of bits of an address outputted to address bus 2 and each of bits of data set in address mask register 19, and outputs the result of operation to comparator 452. It is assumed that AND gates 459 of the number equal to the number of bits of an address exist.

AND gate 460 performs an AND operation on each of bits of data stored in data register 142 and each of bits of data set in data mask register 20, and outputs the result of operation to comparator 453. It is assumed that AND gates 460 of the number equal to the number of bits of data exist.

AND gate 461 performs an AND operation on each of bits of data outputted to data bus 3 and each of bits of data set in address mask register 20, and outputs the result of operation to comparator 453. It is assumed that AND gates 461 of the number equal to the number of bits of data exist.

Each of the plurality of comparators 452 compares the operation result outputted from AND gate 458 with the operation result outputted from AND gate 459 and, when the operation results coincide with each other, outputs an H level signal. Each of the plurality of comparators 453 compares the operation result outputted from AND gate 460 with the operation result outputted from AND gate 461 and, when the operation results coincide with each other, outputs an H level signal. When comparators 452 and 453 output the H-level signals, AND gate 454 outputs an H level signal indicative of detection of coincidence.

AND gate 455 performs an AND operation on the operation result outputted from AND gate 454 and a corresponding bit in inhibit table selection register 21. Therefore, AND gate 455 outputs an H level signal only in the case where each of comparators 452 and 453 detects coincidence and the corresponding bit of inhibit table selection register 21 is "1".

When any of outputs of coincidence detecting circuits 451 rises to H level, OR gate 456 outputs an H level signal to NAND gate 457. NAND gate 457 sets a peripheral I/O access cancel signal 46 to the L level when the output signal of OR gate 456 is at the H level and write valid signal 7 is at the H level (valid).

When CPU 1A writes data to peripheral I/O 5a or 5b, each of coincidence detection circuits 451 compares a predetermined bit in an address outputted to address bus 2 and a predetermined bit in data outputted to data bus 3 with a predetermined bit in the write inhibit address registered in address register 141 and a predetermined bit in the write inhibit data registered in data register 142. If any of coincidence detection circuits 451 detects coincidence, access preventing circuit 45 sets peripheral I/O access cancel signal 46 to the L level.

At this time, AND gate 31 masks peripheral I/O access request signal 6, and outputs an L level signal to address decoder 4. Accordingly, address decoder 4 invalidates all of peripheral I/O selection signals 9, thereby canceling a write request to peripheral I/O 5a or 5b.

When the output signal of NAND gate 457 falls to L level, that is, an output signal of inverter 32 rises to H level and peripheral I/O access request signal 6 rises to H level, AND gate 33 sets an interrupt request signal 28 to the H level to generate an interruption to CPU 1A. In such a manner, when predetermined data is written to the control register to which writing is inhibited, an interruption to CPU 1A can be generated.

As described above, in the microprocessor in the embodiment, access preventing circuit 25 masks peripheral I/O access request signal 6 on the basis of the write inhibit addresses, write inhibit data, address mask register 19, data mask register 20, and inhibit table selection register 21. Consequently, in addition to the effects described in the second embodiment, consecutive addresses of peripheral I/Os to which writing is inhibited can be designated, only a predetermined bit in write inhibit data can be validated, or only a specific register in address registers 141 and data registers 142 can be validated.

By referring to inhibit access reference register 22, the user can recognize an address and data of a peripheral I/O to which data is written, so that the user can easily debug a program.

Fifth Embodiment

Figure 9:
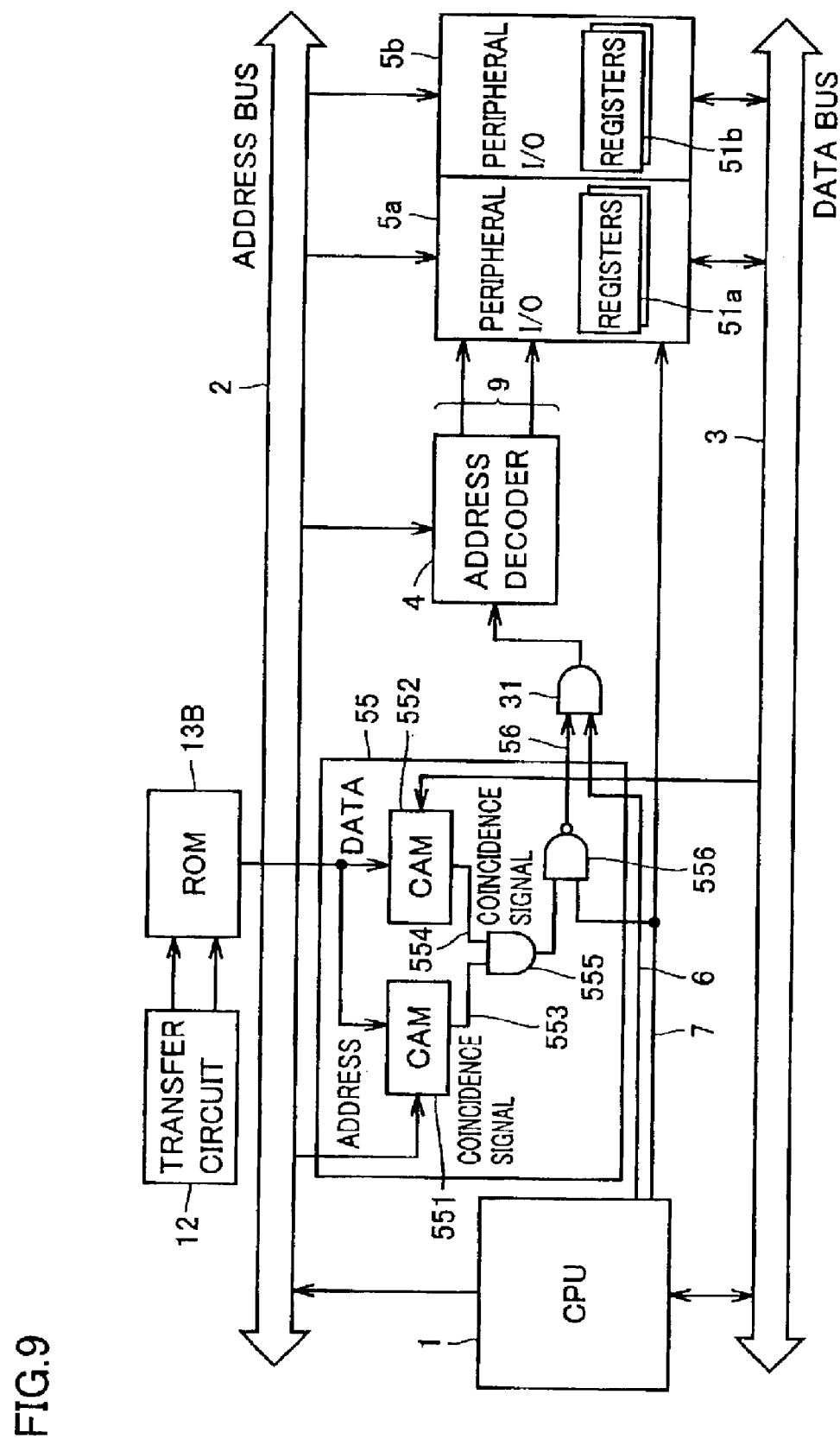
FIG. 9 is a block diagram showing a schematic configuration of a microprocessor according to a fifth embodiment of the present invention.

FIG. 9 is a block diagram showing a schematic configuration of a microprocessor according to a fifth embodiment of the present invention. The microprocessor includes CPU 1, peripheral I/Os 5a and 5b, address decoder 4, ROM 13B for storing write inhibit addresses and write inhibit data, an access preventing circuit 55 for preventing an access to peripheral I/O 5a or 5b on the basis of the write inhibit addresses and write inhibit data stored in ROM 13B, transfer circuit 12 for transferring the write inhibit addresses and write inhibit data stored in ROM 13B to access preventing circuit 55, and AND gate 31. The same reference numeral is designated to a part having the same configuration and function as that in the microprocessor in the second embodiment shown in FIG. 3.

The microprocessor is constructed by a single semiconductor chip. However, ROM 13B may be provided either inside or outside of the semiconductor chip.

Transfer circuit 12 controls ROM 13B so as to transfer the write inhibit addresses stored in ROM 13B to associative memories (hereinafter, referred to as CAMs (Content Addressable Memories)) 551 and 552 in access preventing circuit 55 in response to a signal supplied from the outside of the semiconductor chip, for example, a reset signal. The reset signal is also supplied to CPU 1. To start a system in which the microprocessor is assembled, CPU 1 reads out a program from a memory (not shown) in response to the reset signal and executes the program.

Access preventing circuit 55 includes a CAM 551 to which the write inhibit addresses stored in ROM 13B are transferred, a CAM 552 to which the write inhibit data stored in ROM 13B are transferred, an AND gate 555, and a NAND gate 556.

CAM 551 holds the write inhibit addresses transferred from ROM 13B and, when any of the stored write inhibit addresses coincides with the address outputted to address bus 2, sets a coincidence signal 553 to the H level.

CAM 552 stores the write inhibit data transferred from ROM 13B and, when any of the stored write inhibit data coincides with data outputted to data bus 3, sets a coincidence signal 554 to the H level.

When coincidence signal 553 outputted from CAM 551 is at the H level and coincidence signal 554 outputted from CAM 552 is at the H level, AND gate 555 outputs an H level to NAND gate 556. If AND gate 555 is at the H level and write valid signal 7 is at the H level (valid), NAND gate 556 sets a peripheral I/O access cancel signal 56 to the L level.

At the time of writing data to peripheral I/O 5a or 5b by CPU 1, if the address coinciding with the address outputted to address bus 2 is stored in CAM 551 and data coinciding with data outputted to data bus 3 is stored in CAM 552, access preventing circuit 55 sets peripheral I/O access cancel signal 56 to the L level.

At this time, AND gate 31 masks peripheral I/O access request signal 6, and outputs an L level signal to address decoder 4. Accordingly, address decoder 4 invalidates all of peripheral I/O selection signals 9, thereby canceling a write request to peripheral I/O 5a or 5b.

As described above, in the microprocessor in the embodiment, immediately after resetting, the write inhibit addresses and write inhibit data stored in ROM 13B are transferred to CAMs 551 and 552 which cannot be accessed by CPU 1, and access preventing circuit 55 masks peripheral I/O access request signal 6 on the basis of the write inhibit addresses and write inhibit data. Consequently, in addition to the effects described in the second embodiment, the configuration of access preventing circuit 55 can be simplified, and the circuit scale can be reduced.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A microprocessor comprising:
    a processor;
    a peripheral I/O having a control register;
    an address register storing an address of a control register to which writing is inhibited, and to which data cannot be written by said processor; and
    a write inhibiting circuit inhibiting writing to said control register by said processor when an address outputted from said processor coincides with the address stored in said address register.

2. The microprocessor according to claim 1, wherein
    said write inhibiting circuit inhibits writing to said control register by said processor when the address outputted from said processor coincides with the address stored in said address register and an operation mode of said processor is a debugging mode.

3. The microprocessor according to claim 1, further comprising an address mask register masking each of bits of an address, wherein
    said write inhibiting circuit masks the address outputted from said processor and the address stored in said address register by said address mask register and, when the masked addresses coincide with each other, inhibits writing to said control register by said processor.

4. The microprocessor according to claim 1, further comprising a plurality of address registers, wherein
    said write inhibiting circuit includes a selection register selecting any of said plurality of address registers so as to be validated.

5. The microprocessor according to claim 1, further comprising a plurality of address registers, wherein
    said write inhibiting circuit includes a reference register storing information indicating which of said plurality of address registers inhibits writing to the control register.

6. The microprocessor according to claim 1, further comprising a data register storing data of which writing to the control register is inhibited, and to which data cannot be written by said processor, wherein
    said write inhibiting circuit inhibits writing to said control register by said processor when the address and data outputted from said processor coincide with the address stored in said address register and the data stored in said data register.

7. The microprocessor according to claim 6, wherein
    said write inhibiting circuit inhibits writing to said control register by said processor when the address and data outputted from said processor coincide with the address stored in said address register and the data stored in said data register, and an operation mode of said processor is a debugging mode.

8. The microprocessor according to claim 6, further comprising:
    an address mask register masking each of bits of an address; and
    a data mask register masking each of bits of data, wherein
    when said write inhibiting circuit masks the address outputted from said processor and the address stored in said address register by said address mask register, the masked addresses coincide with each other, masks data outputted from said processor and the data stored in said data register by said data mask register, and the masked data coincide with each other, said write inhibiting circuit inhibits writing to said control register by said processor.

9. The microprocessor according to claim 6, further comprising a plurality of address registers and a plurality of data registers, wherein
    said write inhibiting circuit includes a selection register indicating which of said plurality of address registers and said plurality of data registers are validated.

10. The microprocessor according to claim 6, further comprising a plurality of address registers and a plurality of data registers, wherein
    said write inhibiting circuit includes a reference register for storing information indicating an address register in said plurality of address registers and a data register in said plurality of data registers, by which writing to a control register is inhibited.

11. The microprocessor according to claim 1, wherein
    when writing to said control register by said processor is inhibited, said write inhibiting circuit generates an interruption to said processor.

12. A microprocessor comprising:
    a processor;
    a peripheral I/O having a control register;
    an address register storing an address of a control register to which writing is inhibited;
    a write inhibiting circuit inhibiting writing to said control register by said processor when an address outputted from said processor coincides with the address stored in said address register;
    a nonvolatile memory storing an address of a control register to which writing is inhibited; and
    a transfer circuit transferring the address stored in said nonvolatile memory to said address register.

13. The microprocessor according to claim 12, further comprising a data register storing data of which writing to the control register is inhibited, wherein
    said transfer circuit transfers data stored in said nonvolatile memory to said data register, and
    said write inhibiting circuit inhibits writing to said control register by said processor when the address and data outputted from said processor coincide with the address stored in said address register and the data stored in said data register.

14. A microprocessor comprising:

a processor;

a peripheral I/O having a control register;

a first associative memory storing an address of a control register to which writing is inhibited, and to which data cannot be written by said processor; and a write inhibiting circuit inhibiting writing to said control register by said processor when an address outputted from said processor coincides with the address stored in said first associative memory.

15. The microprocessor according to claim 14, further comprising a second associative memory storing data of which writing to a control register is inhibited, and to which data cannot be written by said processor, wherein said write inhibiting circuit inhibits writing to said control register by said processor when the address and data outputted from said processor coincide with the address stored in said first associative memory and the data stored in said second associative memory.

* * * * *